(12) United States Patent
Borella

(10) Patent No.: US 6,993,039 B2
(45) Date of Patent: Jan. 31, 2006

(54) SYSTEM AND METHOD FOR GRE HEARTBEATS

(75) Inventor: Michael S. Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 522 days.

(21) Appl. No.: 10/200,241

(22) Filed: Jul. 22, 2002

(65) Prior Publication Data

US 2004/0013118 A1 Jan. 22, 2004

(51) Int. Cl.
H04L 12/28 (2006.01)

(52) U.S. Cl. ...................................................... 370/401
(58) Field of Classification Search ................ 370/328, 370/338, 401, 352, 389, 392, 400, 470, 474, 370/466, 477
See application file for complete search history.

(56) References Cited

U.S. PATENT DOCUMENTS

| | | | |
|---|---|---|---|
| 6,473,798 B1 | 10/2002 | Grosser, Jr. et al. | 709/224 |
| 6,614,809 B1 | 9/2003 | Verma et al. | 370/469 |
| 6,779,051 B1 * | 8/2004 | Basil et al. | 710/33 |

OTHER PUBLICATIONS

"User Datagram Protocol," Internet Engineering Task Force Request for Comment 768, J. Postel, Aug. 1980.
"Darpa Internet Program Protocol Specification," Internet Engineering Task Force Request for Comment 791, Information Sciences Institute, Sep. 1981.
"Darpa Internet Program Protocol Specification," Internet Engineering Task Force Request for Comment 793, Information Sciences Institute, Sep. 1981.
"Generic Routing Encapsulation (GRE)," Internet Engineering Task Force Request for Comment 1701, Hanks, et al., Oct. 1994.
"Generic Routing Encapsulation over Ipv4 networks," Internet Engineering Task Force Request for Comment 1702, Hanks, et al., Oct. 1994.
"IP in IP Tunneling," Internet Engineering Task Force Request for Comment 1853, W. Simpson, Oct. 1995.
"IP in Mobility Support," Internet Engineering Task Force Request for Comment 2002, C. Perkins, Oct. 1996.
"IP Encapsulation within IP," Internet Engineering Task Force Request for Comment 2003, C. Perkins, Oct. 1996.
"Minimal Encapsulation within IP," Internet Engineering Task Force Request for Comment 2004, C. Perkins, Oct. 1996.
"Applicability Statement for IP Mobility Support," Internet Engineering Task Force Request for Comment 2005, J. Solomon, Oct. 1996.

(Continued)

Primary Examiner—Chi Pham
Assistant Examiner—Alexander O. Boakye
(74) Attorney, Agent, or Firm—McDonnell Boehnen Hulbert & Berghoff LLP

(57) ABSTRACT

A GRE tunnel initiator and a tunnel endpoint can exchange GRE Heartbeat messages to provide status information about the tunnel endpoint. The tunnel endpoint can send the tunnel initiator a GRE Heartbeat message through an established GRE tunnel. The GRE Heartbeat messages can be sent at different times while the GRE tunnel is active, and they can indicate to the GRE tunnel initiator that the tunnel endpoint remains active.

23 Claims, 13 Drawing Sheets

OTHER PUBLICATIONS

"Point-to-Point Tunneling Protocol (PPTP)," Internet Engineering Task Force Request for Comment 2637, Hamzeh, et al., Jul. 1999.

"Generic Routing Encapsulation (GRE)," Internet Engineering Task Force Request for Comment 2784, Farinacci, et al., Mar. 2000.

"Key and Sequence Number Extensions to GRE," Internet Engineering Task Force Request for Comment 2890, G. Dommety, Sep. 2000.

International Search Report for PCT/US03/20987 Mailed Nov. 14, 2003.

* cited by examiner

PPP
150

GRE
152

GRE Heartbeat Packet

| TYPE 350 | LENGTH 352 | GRE HEARTBEAT CAPABILITY 354 |

GRE Heartbeat Capability Extension

FIG. 7

SYSTEM AND METHOD FOR GRE HEARTBEATS

FIELD OF THE INVENTION

This invention relates generally to computer networks. More specifically, it relates to tunneling between endpoints of a tunnel in a computer network.

BACKGROUND OF THE INVENTION

The Generic Routing Encapsulation ("GRE") protocol can be used to establish a tunnel between two devices on a computer network. The tunnel can be a virtual data link between the two devices, and it can be created by encapsulating one data packet inside another data packet and by adding additional tunnel packet headers. One common type of GRE tunnel is IP-in-IP, in which Internet Protocol ("IP") packets are encapsulated inside other IP packets. Another common type of GRE tunnel is PPP-over-IP, in which Point to Point ("PPP") packets are encapsulated inside IP packets.

One application for GRE tunnels is Mobile IP, which allows a mobile node to move among IP subnets. Mobile IP supports using GRE to create an IP-in-IP tunnel between a home agent and a foreign agent. Packets addressed to a mobile node are first routed to the home agent, which then forwards the packet through the tunnel to the foreign agent. The foreign agent then provides the packet to the mobile node.

Another application for GRE tunnels is Virtual Private Networks ("VPNs"). In a VPN, the Point to Point Tunneling Protocol ("PPTP") can be used to establish a PPP over IP tunnel between two endpoints. The PPP over IP tunnel connects the two endpoints, which are located on private networks, via a public network. PPTP uses a variety of GRE to establish the tunnel.

GRE tunnels can be unidirectional or bi-directional. Additionally, GRE tunnels can terminate at different endpoints (e.g., IP addresses) than the associated tunnel signaling. For example, Mobile IP signaling can be used between a tunnel initiator and a first endpoint IP address in order to establish a GRE tunnel to a second endpoint IP address.

Ongoing signaling transactions in a GRE tunnel do not generally provide reachability and liveness of the endpoints. Therefore, one GRE endpoint would not be able to determine the reachability and liveness of the other endpoint. As an example, an establishing endpoint can establish a GRE tunnel with a receiving endpoint, and the establishing endpoint can send messages through the tunnel to the receiving endpoint. If the receiving GRE endpoint crashes, it would not send error messages back to the establishing GRE endpoint. The establishing GRE endpoint can continue to send packets to the receiving endpoint, which would be silently discarded by the network for an indeterminable period of time because the endpoint is unreachable.

One way to convey information about the GRE tunnel endpoints is by using a ping mechanism. As is known in the art, ping is a protocol for testing whether a particular device is connected to the Internet by sending a packet to its IP address and waiting for a response from the device. Using ping, however, requires a separate ping session in addition to the GRE tunnel. Additionally, the ping responses must be integrated with GRE tunneling traffic indicators in order to accurately and efficiently detect the status of the endpoints. This requires additional overhead in relaying ping messages between the GRE tunnel endpoints, in addition to the complexity of establishing and integrating ping sessions with the GRE tunnel.

Therefore, there exists a need to provide an improved method for monitoring the reachability and liveness of GRE endpoints.

SUMMARY OF THE INVENTION

A GRE tunnel initiator and a tunnel endpoint can establish a GRE tunnel, for example between the two endpoints. In addition to establishing the tunnel, the GRE tunnel initiator and the tunnel endpoint can agree to use GRE Heartbeats. The GRE Heartbeats can be sent from the tunnel endpoint to the tunnel initiator, and they can indicate a status of the tunnel endpoint.

The GRE Heartbeats can be sent through the GRE tunnel using GRE Heartbeat packets. The GRE Heartbeat packets can be sent from the tunnel endpoint to the tunnel initiator, for example, in response to an initial request from the tunnel initiator. Alternatively, the tunnel endpoint can periodically send GRE Heartbeat packets to the tunnel initiator. The GRE Heartbeat packets can indicate to the tunnel initiator that the tunnel endpoint remains active.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which:

FIG. 2 is a block diagram of an exemplary protocol stack for PPP-in-IP tunneling using GRE Heartbeats;

FIG. 7 is a block diagram illustrating an exemplary GRE Heartbeat capability extension that tunnel endpoints can use to establish a GRE Heartbeat session;

DETAILED DESCRIPTION OF EXEMPLARY EMBODIMENTS

Figure 1:
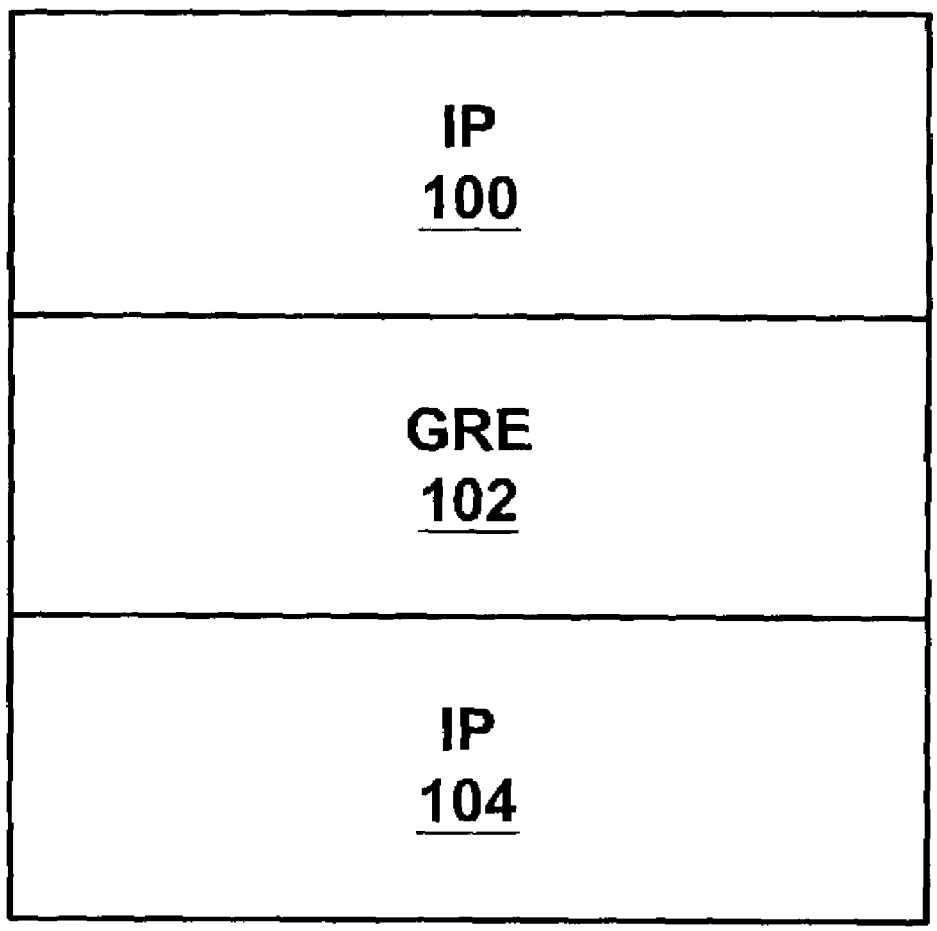
FIG. 1 is a block diagram of an exemplary protocol stack for IP-in-IP tunneling using GRE Heartbeats.

The Generic Routing Encapsulation ("GRE") protocol is commonly used to create a tunnel between two devices on a computer network. The tunnel is a conceptual data flow between the two devices. Tunnels are commonly used to forward packets between tunnel endpoints, to provide security for packets traveling between the tunnel endpoints and to perform various other functions.

Although GRE provides a method for establishing a tunnel, it does not provide a method for monitoring the reachability and liveness of the tunnel's endpoints. For example, one endpoint can establish a GRE tunnel with another endpoint. The tunnel can be either unidirectional or bi-directional. Ongoing signaling transactions between the two endpoints would not provide reachability or liveness information about the endpoint. As a consequence, one of the endpoints could become unavailable without the other tunnel termination endpoint detecting the failure. Thus, one of the endpoints could continue to send packets through the tunnel to the other endpoint, which would then be discarded by the network because the receiving endpoint is unavailable.

In order to provide an efficient way of monitoring the reachability and liveness of GRE tunnel endpoints, the endpoints can use GRE Heartbeats. GRE Heartbeats can provide one tunnel endpoint with reachability and liveness information of the other endpoint, for example, by integrating status information for the endpoints into GRE packets sent through the tunnel. Integrating status information into the GRE packets can advantageously provide status information for the endpoints, and it can also reduce the overhead required to provide the status information by using tunnel packets instead of using a separate status mechanism that must be integrated with the GRE session.

GRE tunnels, such as ones using GRE Heartbeats, can be implemented in a variety of different ways. Once way to implement GRE tunnels is by encapsulation. Encapsulation is a method whereby one packet is placed inside another packet for transmission between endpoints. For example, one endpoint can receive a packet for transmission through a tunnel. The endpoint can place the received packet inside another packet. Thus, the received packet would be an encapsulated packet, which is encapsulated inside an encapsulating packet. This can be done, for example, by placing the encapsulated packet in the payload section of the encapsulating packet.

The header information for the encapsulating packet can be specific to the tunnel, such as by specifying the endpoints of the tunnel as the source and destination addresses in the encapsulating packet's header. Once created, the encapsulating packet can then be transmitted through the tunnel to the other endpoint. The other endpoint can receive the encapsulating packet and remove the encapsulated packet, for example by extracting the encapsulated packet from the data portion of the encapsulating packet. The encapsulated packet can then be sent on to its intended destination.

GRE can be used to establish many different types of tunnels. For example, GRE can be used to establish IP-in-IP tunnels and PPP-over-IP tunnels. In IP-in-IP tunneling, IP packets are encapsulated in other IP packets for transmission over an IP network. In PPP-over-IP tunneling, PPP packets are encapsulated in IP for transmission over an IP network. Of course, GRE is not limited to the IP and PPP protocols, and it can be used with many other types of tunnels.

FIG. 1 is a block diagram of an exemplary protocol stack for IP-in-IP tunneling using GRE Heartbeats. A first IP Layer 100 includes IP packets, such as can be sent between two devices. A GRE Layer 102 can encapsulate IP packets in the first IP Layer 100 into IP packets in a second IP Layer 104. Thus, IP packets in the second IP Layer 104 serve as a transport mechanism for IP packets in the first IP Layer 100. The GRE Layer 102 can also handle sending GRE Heartbeats between the two devices. While IP-in-IP tunneling can be used in a variety of different applications, one common use for IP-in-IP tunneling is in Mobile IP networks.

Figure 2:
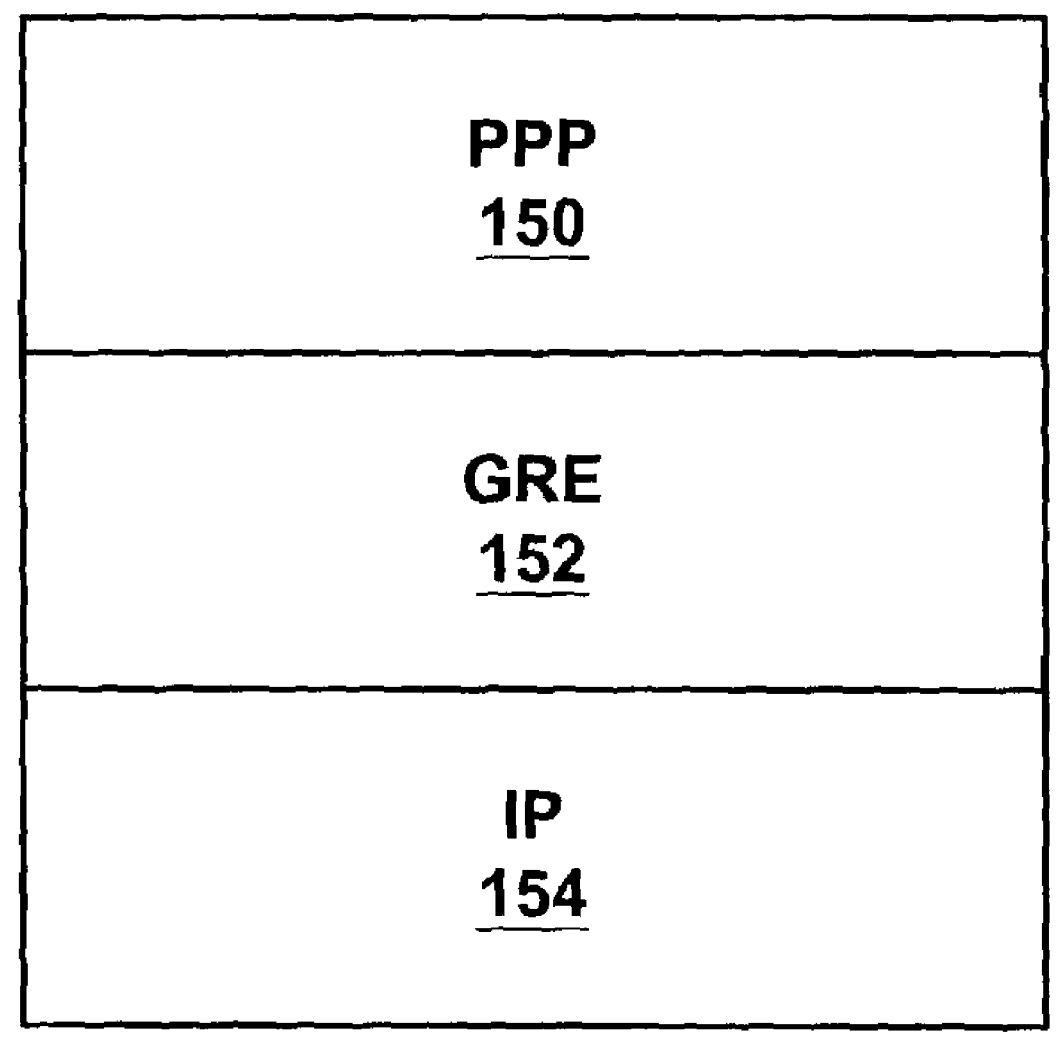

FIG. 2 is a block diagram of an exemplary protocol stack for PPP-over-IP tunneling using GRE Heartbeats. A PPP Layer 150 includes PPP packets, such as can be sent between devices in a PPP connection. A GRE Layer 152 encapsulates the PPP packets into packets in an IP Layer 154. Thus, using GRE, PPP packets are encapsulated into IP packets for tunneling across an IP network. Additionally, the GRE Layer 154 can handle sending GRE Heartbeats between the two devices. Once common application for PPP-over-IP tunneling is in VPNs. Of course, other PPP-over-IP tunnels can be used in other applications.

Mobile IP

The Mobile Internet Protocol allows "mobile" nodes to transparently move between different Internet Protocol subnetworks ("subnets"). The Internet Protocol is an addressing protocol designed to route traffic within a network or between networks. The Internet Protocol is used on many computer networks including the Internet, intranets and other networks. Internet Protocol addresses are typically assigned to "immobile" nodes on a network. An immobile node may be moved to a different computer network, but is typically associated with a static physical location.

Internet Protocol addresses are typically assigned to mobile nodes based on their home Internet Protocol subnet. The home subnet is connected to an external network (e.g., the Internet or an intranet) with a "home agent" that serves as the subnet's gateway router. As is known in the art, the gateway connects computer networks using different networking protocols or operating at different transmission capacities. As is known in the art, a router translates differences between network protocols and routes data packets to an appropriate network node or network device.

Mobile IP allows a mobile node to move among different subnets even though the mobile node's IP address is associated with a single subnet. When the mobile node "roams," (i.e., dynamically changes its physical location) it periodically transmits "agent solicitation" messages to other gateway routers. The mobile node also listens for "agent advertisement" messages from other gateway routers. When the mobile node receives an agent advertisement message indicating that it is now on a foreign subnet, it registers with the foreign gateway router or "foreign agent" and its home agent. The registration with the home agent indicates the mobile node is away from "home" (i.e., away from its home subnet). The registration with the foreign agent allows the mobile node to receive data on the foreign subnet.

The Mobile Internet Protocol allows a mobile node to dynamically change its network connectivity in a manner that is transparent to protocol layers above the Internet Protocol layer. For example, without re-establishing Transmission Control Protocol ("TCP") or User Datagram Protocol ("UDP") sessions. As is known in the art, the Internet Protocol suite includes from lowest-to-highest, a link, network, transport and application layer. The Internet Protocol typically resides in the network layer in the Internet Protocol suite. Transmission Control Protocol and User Datagram Protocol typically reside in the transport layer of the Internet Protocol suite.

Transmission Control Protocol and User Datagram Protocol are often used over IP in computer networks. Transmission Control Protocol provides a connection-oriented, end-to-end reliable protocol designed to fit into a layered hierarchy of protocols that support multi-network applications. User Datagram Protocol provides a transaction oriented datagram protocol, where delivery and duplicate packet protection are not guaranteed.

Mobile IP is also described in more detail in Internet Engineering Task Force ("IETF") Request For Comments ("RFCs") 2002–2005, each of which is incorporated herein by reference in its entirety. IP is described in more detail in IETF RFC 791, which is incorporated herein by reference in its entirety. TCP is described in more detail in IETF RFC 793, which is incorporated herein by reference in its entirety. UDP is described in more detail in IETF RFC 768, which is incorporated herein by reference in its entirety.

Figure 3:
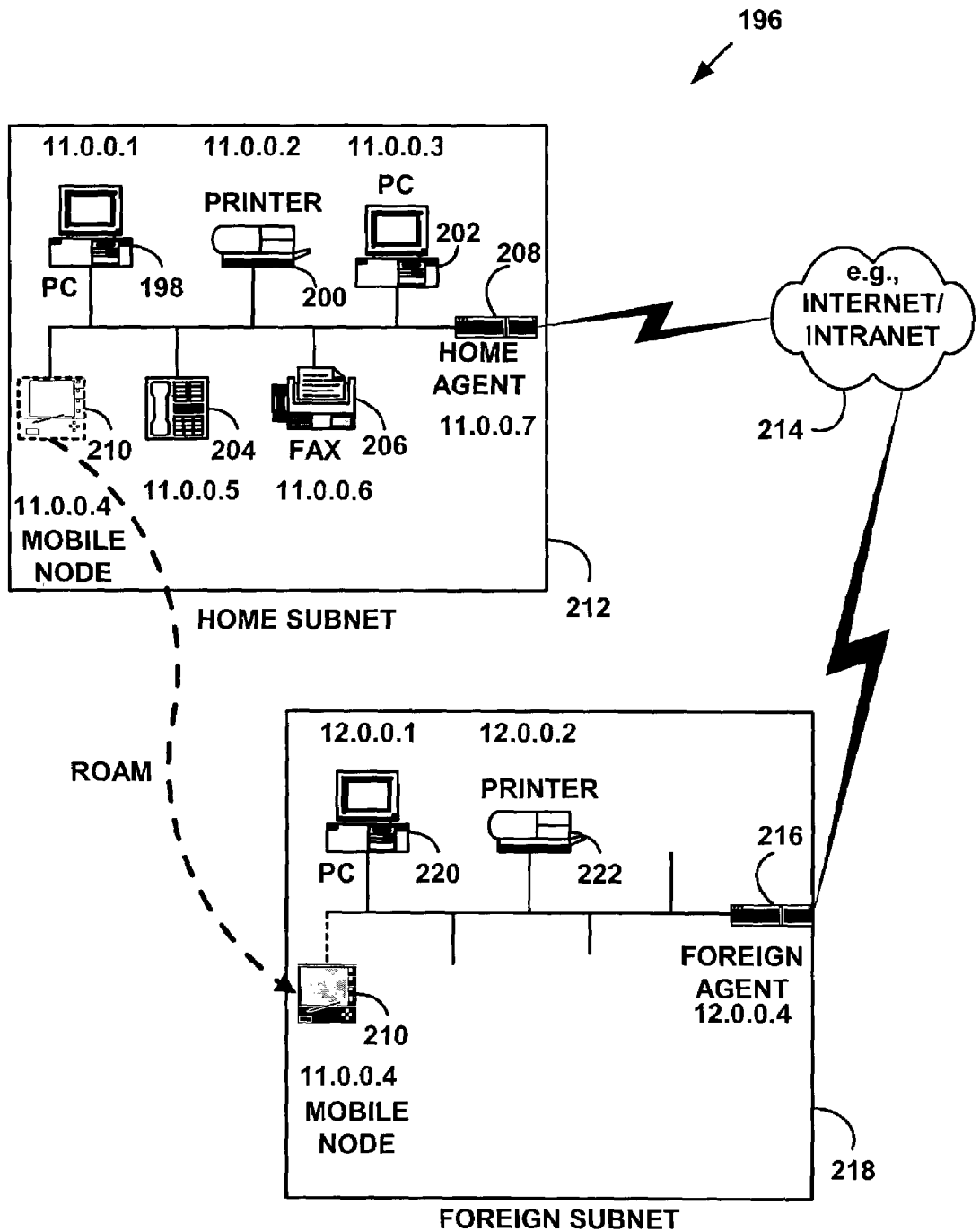
FIG. 3 is a block diagram illustrating an exemplary Mobile Internet Protocol system that uses GRE Heartbeats.

FIG. 3 is a block diagram illustrating an exemplary mobile IP system 196 that uses GRE Heartbeats. The mobile IP system 196 includes one or more "immobile" network devices 198, 200, 202, 204, 206, 208, six of which are illustrated, and a mobile network device 210, one of which is illustrated. Hereinafter the mobile network device 210 is called a "mobile node 210." However, more or fewer immobile network devices or more mobile network devices can also be used.

The immobile network devices 198, 200, 202, 204, 206, 208 and the mobile node 210 are assigned a network addresses on a Home Subnet 212 as is illustrated in FIG. 3. The home subnet 212 is connected to an external network 214 such as the Internet or an intranet via a Home Agent ("HA") 208. The home agent 208 is a "gateway router" for the home subnet 212. As is known in the art, a gateway connects computer networks using different networking protocols or operating at different transmission capacities. As is known in the art, a router translates differences between network protocols and routes data packets to an appropriate network node or network device.

When mobile node 210 "roams" way from its home subnet 212, it periodically transmits Mobile IP "agent solicitation" messages to foreign agents, such as Foreign Agent ("FA") 216 (i.e., foreign with respect to home subnet 212) via external network 214. The foreign agent 216 resides on a foreign subnet 218 with one or more foreign immobile network devices 220, 222, two of which are illustrated. The foreign subnet 218 may also include one or more mobile nodes. The foreign agent 216 is a gateway router for the foreign subnet 218. The foreign immobile network devices 220, 222 are assigned network addresses (e.g., IP addresses) on the foreign subnet 216 as is illustrated in FIG. 3.

Roaming mobile node 210 listens for mobile IP "agent advertisement" messages from foreign agents (i.e., foreign gateway routers such as foreign agent 16). When roaming mobile node 210 receives an agent advertisement message from a foreign agent indicating that it is now on a foreign subnet (e.g., foreign subnet 218), mobile node 210 registers with the foreign agent (e.g., foreign agent 216) and its home agent (e.g., home agent 208) indicating that the mobile node 210 has roamed away from its home subnet 212.

As is illustrated in FIG. 3, the mobile node 210 has a network address (e.g., IP address) of 11.0.0.4 on the home subnet 212. The home agent 208 has a network address of 11.0.0.7 on the home subnet 212. The mobile node 210 with network address 11.0.0.4, belongs to the home subnet 212 with network access prefix of 11.0.0 and a prefix length of 24 bits (i.e., 11.0.0.X/24). Network devices on the home subnet 212 have network addresses beginning with the network access prefix of 11.0.0 and a prefix length of 24 bits. Since the home agent 208 is advertising a route to the home subnet 212 at 11.0.0.X/24, it will accept data packets from external network 214 for network addresses with the network access prefix 11.0.0.X/24. For example, the home agent 208 accepts data packets for the mobile node 210 that has a home network address of 11.0.0.4, where X=4 since the network access prefix is equal to 11.0.0 with a length of 24-bits.

The foreign agent 216 has a network address of 12.0.0.4 on the foreign subnet 218. The foreign agent advertises a route to the foreign subnet 218 with network access prefix/prefix length of 12.0.0.Y/24. The foreign agent 216 will accept data packets that have a network address of 12.0.0.Y/24 on the foreign subnet 218. For example, the foreign agent will accept data packets for the computer 220 with a network address of 12.0.0.1, where Y=1, since the network access prefix is equal to 12.0.0 with a length of 24-bits.

The mobile node 210 uses its home network address of 11.0.0.4 on the home subnet 212 to register with the foreign agent 216 and the home agent 208. After registration of the mobile node 210, the foreign agent 216 will also accept data packets for the mobile node 210 at the specific home network address 11.0.0.4/24 for the mobile mode 210 as well as data packets that have a network prefix of 12.0.0/24.

The network addresses illustrated in FIG. 3 are "globally routable." The globally routable network addresses on the home subnet 212 and the foreign subnet 218 are reachable via the external network 214. However, it is also possible that devices on the home subnet 212 do not use globally routable addresses. In this case, a network address translation ("NAT") protocol running on the home agent 208 can be used to translate between the globally routable address used to send packets to the home subnet 212 and the non-globally routable addresses used by devices on the home subnet 212.

Figure 4:
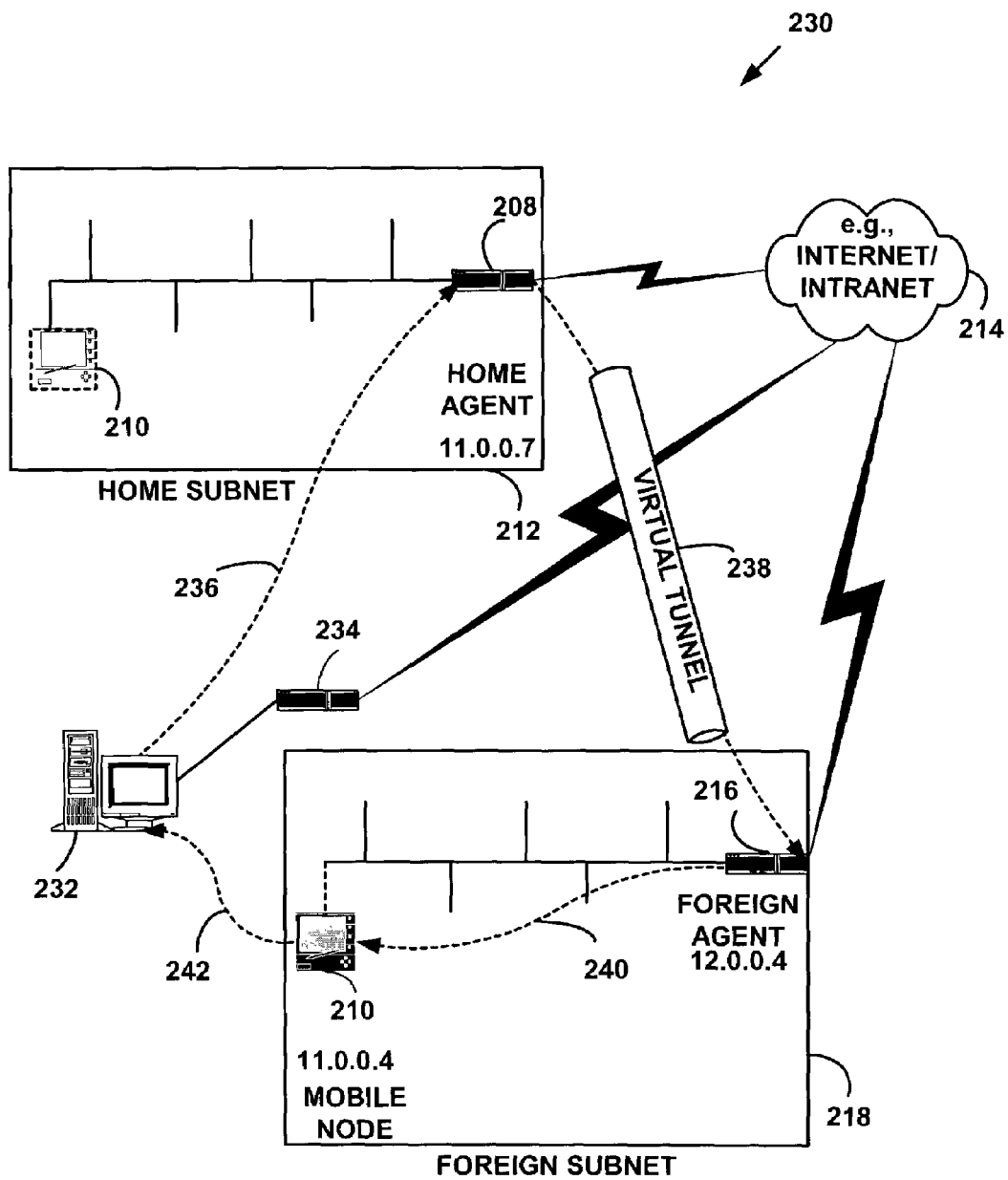
FIG. 4 is a block diagram illustrating Mobile Internet Protocol communications in the exemplary Mobile Internet Protocol system of FIG. 3.

FIG. 4 is a block diagram illustrating exemplary Mobile IP communications in an exemplary Mobile IP system 230. Round-trip routing to and from the mobile node 210 is typically asymmetric and follows a triangular path. A "virtual" triangular routing path is illustrated in FIG. 4 with dashed lines. However, the actual routing path is accomplished between the home subnet 212 and the foreign subnet 218 using the solid line connections illustrated in FIG. 4 via external network 214.

As is illustrated in FIG. 4, a correspondent 232 with a router 234 receives data packets for the mobile node 210 from the external network 214. The correspondent 232 is, for example, a server being used by mobile node 210. In FIG. 4, the correspondent 232 sends 236 data packets for the mobile node 210 to the mobile node's home agent 208. Dashed line 236 illustrates a "virtual" data flow pathway between the correspondent 234 and the home agent 208.

Assuming that the mobile node 210 has roamed to the foreign subnet 218 and has registered its current location (e.g., on foreign subnet 218 and on the home subnet 212), the home agent 208 creates a "virtual tunnel" 238 to the foreign agent 216 via external network 214. A virtual tunnel can be created, for example, by encapsulating a data packet inside another data packet by adding additional tunnel packet headers.

GRE can be used to establish an IP-in-IP tunnel that serves as the virtual tunnel; however, other virtual tunnels can also be created (e.g., UDP tunnels or double IP-in-IP tunneling). Once established, GRE Heartbeats can provide the home agent 208 with status information, such as reachability and liveness information, for the foreign agent 216. GRE is described in more detail in IETF RFCs 2784 and 2890, each of which is incorporated herein by reference in its entirety. IP-in-IP tunneling is described in more detail in IETF RFC 1853, which is incorporated herein by reference in its entirety.

When the foreign agent 216 receives tunneled packets, it removes the tunnel packet headers and routes 240 them to the mobile node 210, which is currently registered on the foreign network 218. However, when the mobile node 210 sends packets to an external destination on external network 214, no tunneling is used. Data packets are transmitted 242 from mobile node 210 to the correspondent 232. Thus, a "virtual" routing triangle is formed as illustrated by the dashed lines in FIG. 4. The virtual routing triangle is a "logical" route rather than a "physical route." The physical route includes routes through external network 214. The correspondent 232 routes the data packets on to the external destination via the external network 214. Of course, reverse tunneling could be used to send packets from the mobile node 210.

The mobile node 210 periodically transmits "keep-alive" messages using Internet Control Message Protocol ("ICMP") messages, including standard ICMP messages, and other ICMP messages that are unique to Mobile IP. The mobile node 210 can roam to foreign subnets other than foreign subnet 218 and register with other foreign agents using Mobile IP.

Virtual Private Networks

In addition to Mobile IP, GRE is commonly used in a Virtual Private Network ("VPNs") to establish a tunnel between two endpoints. As is common in VPNs, the Point to Point Tunneling Protocol ("PPTP") is used to create a tunnel between two endpoints. PPTP allows PPP packets to be tunneled through an IP network. PPTP uses an extended version of GRE to carry PPP packets within IP packets. As with Mobile IP, GRE Heartbeats can provide status information, such as reachability and liveness information, about the tunnel endpoints.

Figure 5A:
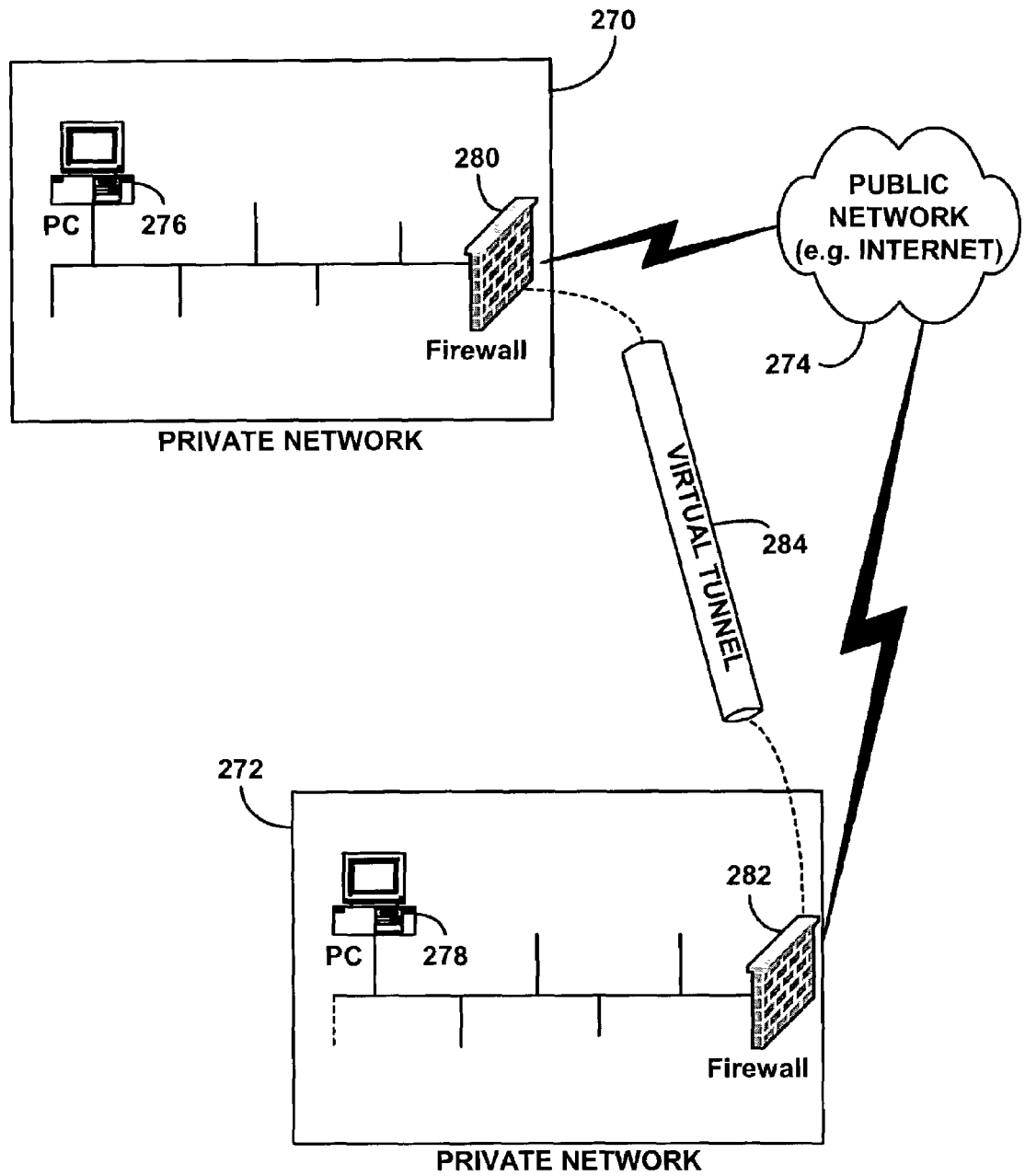
FIG. 5A is a block diagram of an exemplary Virtual Private Network that uses GRE Heartbeats.

FIG. 5A is a block diagram of an exemplary Virtual Private Network that uses GRE Heartbeats. A VPN is ordinarily formed by connecting two or more private networks over a public network. Once connected, the two private networks function as a single private network. In order to provide security for packets traveling over the public network, VPNs are built using authenticated and encrypted tunnels between secure tunneling firewalls located at the border of each private network.

As depicted in FIG. 5, the VPN includes a first private network 270 and a second private network 272 connected via a public network 274, such as the Internet. The first private network 270 can include a number of devices. As depicted in FIG. 5, the first private network 270 includes a personal computer ("PC") 276. Of course, the first private network 270 can include other types of devices, and it can include more than one device. Similarly, the second private network 272 includes a PC 278; however, it may also include other types of devices, and it may also include more than one device. The two PCs 276, 278 are not limited to personal computers, but they may be laptop computers, printers, servers, Internet appliances or any other type of computing device capable of connecting to a network.

The first private network 270 and the second private network 272 connect over the public network 274 in order to function as a single private network. Access to the private networks 270, 272 can be limited, such as to devices connected to one of the private networks 270, 272. Limiting access to the private networks 270, 272 strengthens network security by reducing the ability of an "outside" device to remotely access the private networks 270, 272. Creating a VPN, however, by connecting the private networks 270, 272 over the public network 274 creates a greater security risk.

By connecting to the public network 274, each of the private networks 270, 272 can now be accessed by computers that are not located on the network. Additionally, packets traveling over the public network 274 can be intercepted by other computers, thereby allowing another computer to read the data traveling between the two private networks 270, 272. In order to counter these security concerns, VPNs commonly use an authenticated and encrypted tunnel to send data over the public network 274.

Each private network 270, 272 includes a firewall at the border of the private network 270, 272 and the public network 274. As shown in FIG. 5, the first private network 270 includes a firewall 280 and the second private network includes a firewall 282. The firewalls 280, 282 protect their respective private networks 270, 272 by admitting only those packets that have been authenticated and encrypted by the other firewall. Thus, there exits a virtual tunnel 284 connecting the two firewalls 280, 282.

As previously described, the virtual tunnel 284 can be established using PPTP. In an exemplary data flow, the PC 276 creates a packet to send to the other PC 272. The packet is sent from the PC 276 through the first private network 270 to the firewall 280. At the firewall 280, the packet is encrypted and encapsulated into an encapsulating packet for transmission to the other firewall 282 via the virtual tunnel 284. The other firewall 282 receives the encapsulating packet from the virtual tunnel 284 and authenticates the encapsulating packet. If it is authentic, the firewall 282 removes the header information from the encapsulating packet, thereby unencapsulating the encapsulated packet. The packet can then be sent over the second private network 272 to its intended recipient, the PC 278.

Figure 5B:
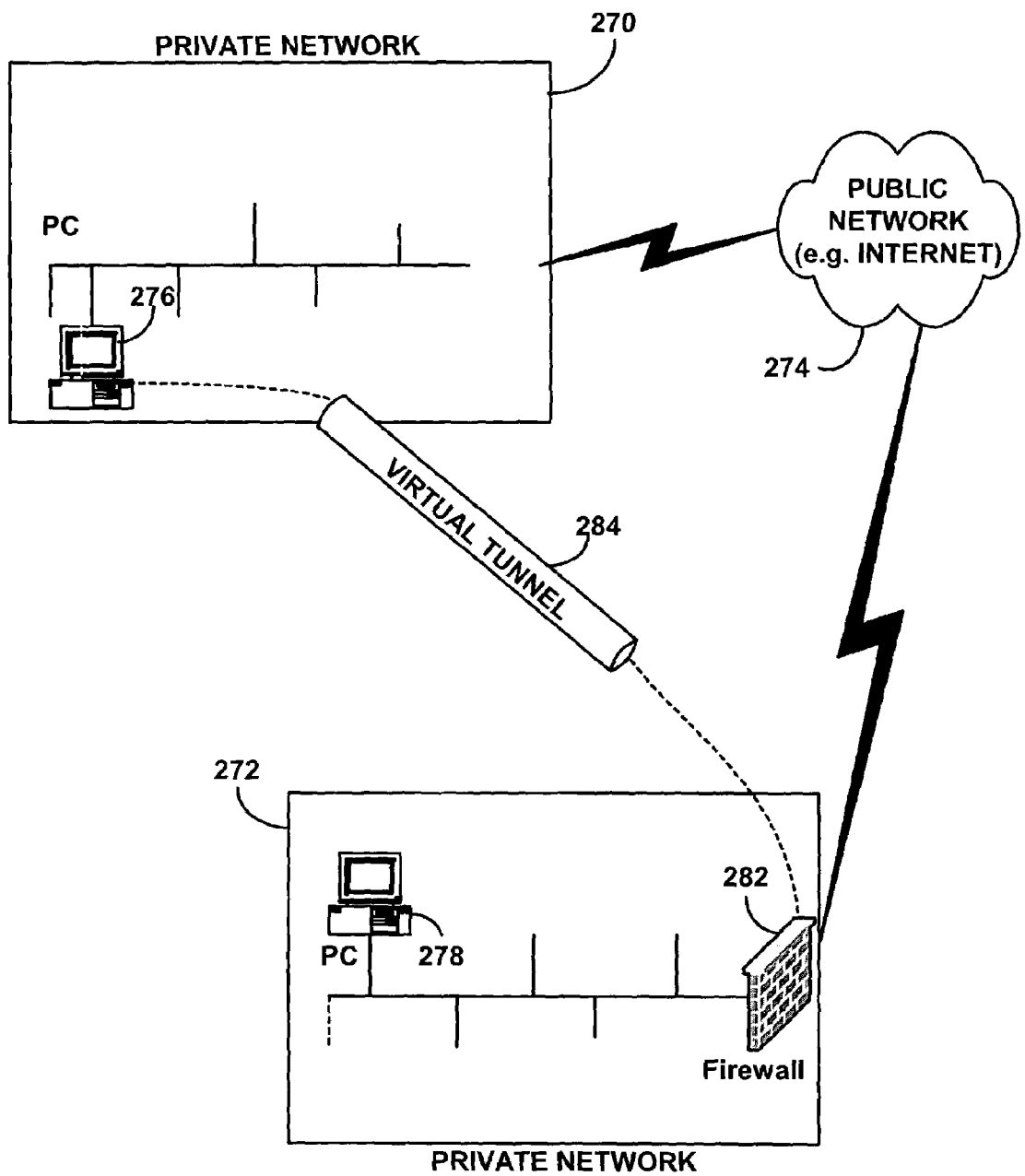
FIG. 5B is a block diagram of an alternate Virtual Private Network configuration that uses GRE Heartbeats.

FIG. 5B is a block diagram of an alternate Virtual Private Network configuration that uses GRE Heartbeats. In this configuration, the PC 276 serves as one endpoint of the virtual tunnel 284 and the firewall 282 serves as the other end of the virtual tunnel 284. The PC 276 can perform encryption and encapsulation of packets for transmission through the virtual tunnel 284. Thus, it can perform the tunnel endpoint functions that were previously performed by the firewall 280 in the configuration described in FIG. 5A. Similarly, the PC 276 can receive packets sent from the firewall 282 through the tunnel 284, and it can unencapsulate and decrypt these packets. This configuration advantageously allows the PC 276 to move to an unsecured network yet still participate in secure communications with the private network 282 via the virtual tunnel 284.

In both VPN configurations, the packets sent over the virtual tunnel 284 can be encapsulated using GRE. In addition to sending GRE data packets through the virtual tunnel 284, GRE Heartbeats can be sent through the tunnel to provide status information about the endpoints. As previously described, GRE Heartbeats allow a tunnel initiator to receive reachability and liveness information about a receiving tunnel endpoint, thereby allowing the tunnel initiator to quickly and efficiently detect the status of the other endpoint.

Figure 6:
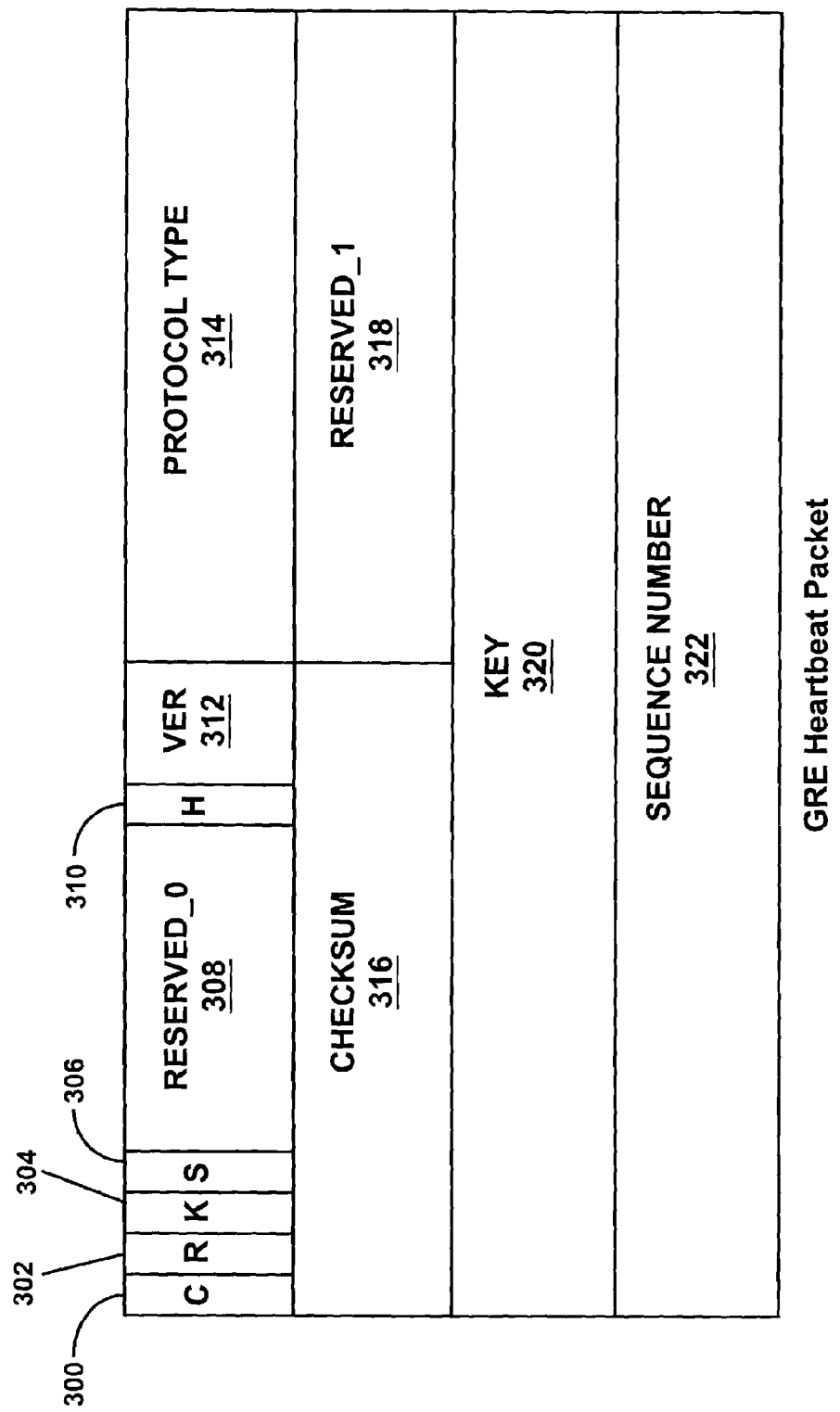
FIG. 6 is a block diagram of an exemplary GRE Heartbeat packet.

GRE Heartbeats can be implemented by using modified GRE packets. The modified GRE packets can be used to send data through the tunnel from one endpoint to another endpoint, such as by encapsulating one packet inside another packet and sending the encapsulating packet through the tunnel. Additionally, modified GRE packets can be sent through the tunnel to request and to receive status information from the tunnel endpoints. Thus, the modified GRE packets can acts as data packets or GRE Heartbeat packets. FIG. 6 is a block diagram of an exemplary GRE Heartbeat packet, such as can be used to send status information between tunnel endpoints. The GRE Heartbeat packet includes a variety of different fields.

The C Bit 300 is a Checksum Present bit, which indicates the presence of a checksum in the GRE Heartbeat packet. This bit can be set to zero or one, depending on the presence of a checksum in the GRE Heartbeat packet. The R Bit 302 is a Routing Present bit, which is also generally set to zero. The K Bit 304 is a Key Present bit. If the K Bit 304 is set to one, then it indicates that the Key Field 320 is present in the GRE Header. Otherwise, if the K Bit 304 is set to zero, then the Key Field 320 is not present in the GRE Header. The S Bit 306 is a Sequence Number Present bit. If the S Bit 306 is set to 1, then it indicates that the Sequence Number Field 322 is present in the GRE Header. Otherwise, when the S Bit 306 is set to zero, the Sequence Number Field 322 is not present in the GRE Header.

The Reserved_0 Field 308 is reserved for future use, or may include other fields in different versions of GRE. These bits are generally set to zero. The H Bit 310 occupies the position normally held by the last bit of the Reserved_0 Field 308 in a standard GRE packet. Of course, the H Bit 310 could alternatively be placed in another location within the Reserved_0 Field 308 or in a different reserved field.

The H Bit 310, when set, indicates that the packet is a GRE Heartbeat packet for the GRE Heartbeat session indicated by the Key Field 320, otherwise the packet is a GRE data packet when the H bit is not set. When the H Bit 310 is set, the Key Field 320 and the Sequence Number Field 322 appear in the packet to identify the GRE session, and thus the K Bit 304 and the S Bit 306 are also set. Of course, a reverse indication could also be used so that the packet serves as a heartbeat identifier for the GRE session when the H Bit 310 is not set.

The VER Field 312 indicates a version of the GRE packet. Different GRE versions may have various modifications in the location and use of its bits, and the different versions may provide additional or less functionality. For example, one or more bits in the reserved fields may be used to provide additional functionality. The Checksum Field 316 can hold a checksum for the packet, which can be used in error checking. The Reserved_1 Field 318 is reserved for future use, and these bits are typically set to zero.

The Key Field 320 is an optional field, and is used in the packet when the K Bit 304 is set. For a GRE data packet, the Key Field 320 can identify an individual traffic flow within a tunnel. For example, packets may need to be routed based on context information not present in the encapsulated data. The Key Field 320 provides this context and defines a logical traffic flow between the endpoints. For a GRE heartbeat indicator packet, the Key Field 320 can identify a particular exchange of heartbeat packets.

The packet includes the Sequence Number Field 322 when the S Bit 306 is set, otherwise the Sequence Number Field 322 is not included in the packet. The Sequence Number Field 322 indicates a sequence for the GRE packet. When the GRE packet is a data packet, the Sequence Number Field 322 can be used to identify an order of packets, so that they can be reassembled in the correct order at the receiver. When the GRE packet is a Heartbeat packet, the Sequence Number Field 322 can identify a particular GRE session.

The endpoints can use GRE Heartbeat packets to convey status information, such as reachability and liveness information. For example, the endpoints can use a signaling protocol to establish a GRE tunnel, and as part of the signaling process the endpoints can agree to use GRE Heartbeats. Packets exchanged by the endpoint to establish the GRE tunnel can use an optional extension to additionally negotiate a GRE Heartbeat session.

FIG. 7 shows an exemplary GRE Heartbeat capability extension that the endpoints can use to establish a GRE Heartbeat session. The GRE Heartbeat capability extension includes three fields. The Type Field 350 indicates the type of the attribute that is unique per all attributes per signaling protocol. The Length Field 352 is the length of the GRE Heartbeat Capability Field 354, in this case two bytes. Of course, two bytes is merely exemplary in nature and other lengths could also be used.

The GRE Heartbeat Capability Field 354 can be one of two values. If the GRE Heartbeat Capability Field 354 is set to one, then GRE Heartbeats are supported. If the GRE Heartbeat Capability Field 354 is set to zero, then GRE Heartbeats are not supported. Of course, the one and zero settings are arbitrary, and other identifiers can be used to indicate whether or not GRE Heartbeats are supported. Other variations are also possible. In one alternate embodiment, the GRE Heartbeat Capability Field 354 is a non-critical attribute, so that an endpoint that doesn't support GRE Heartbeats can still set up a valid GRE tunnel.

The endpoints can use the GRE Heartbeat Capability Field 354 as an extension to the signaling protocol used to establish the GRE tunnel. Thus, GRE Heartbeats can be enabled at the same time the GRE tunnel is established. Of course, the signaling to enable GRE Heartbeats could occur at other times, such as after the GRE tunnel is established.

Figure 8:
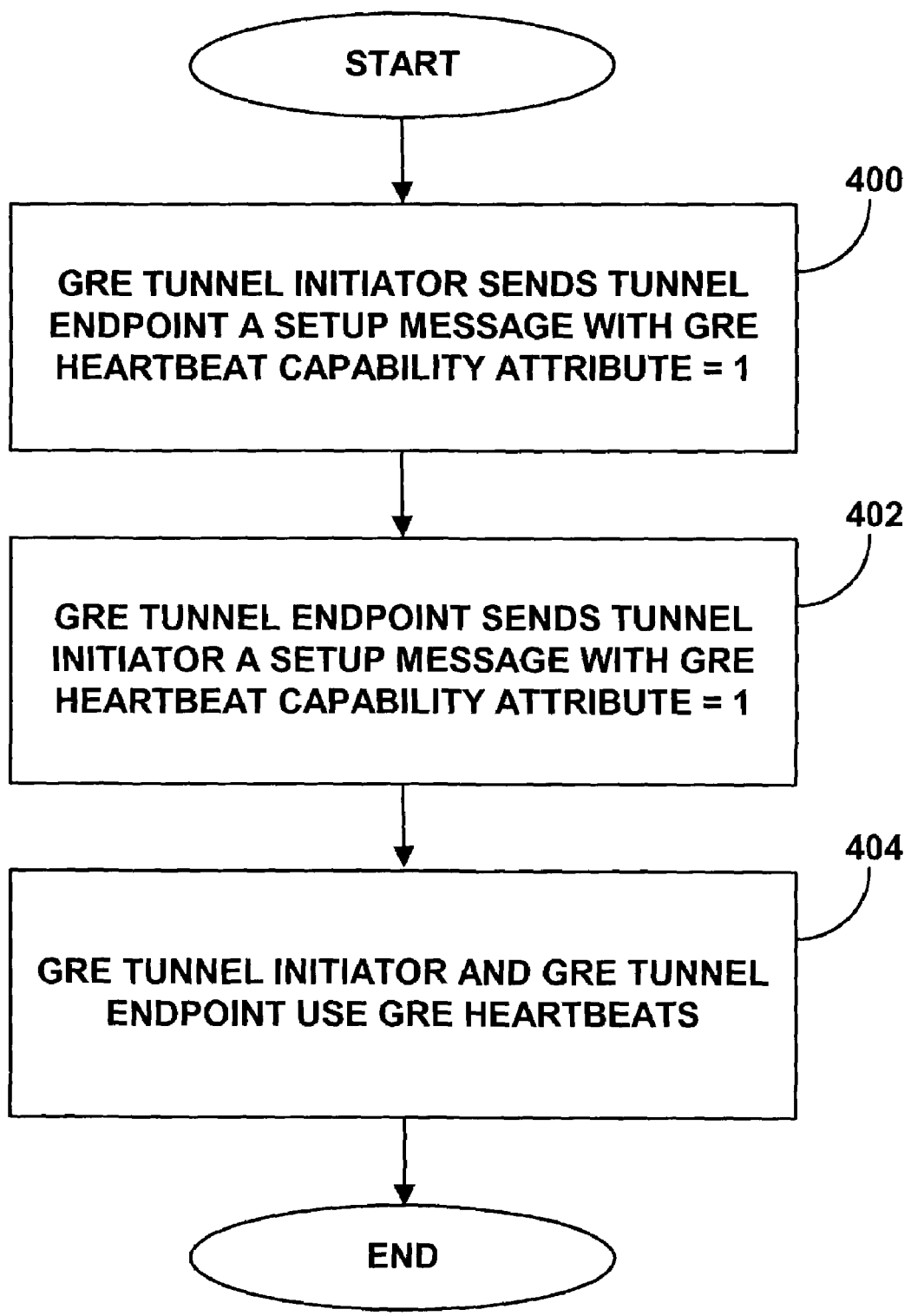
FIG. 8 is a flowchart of an exemplary process for establishing a GRE Heartbeat session between tunnel endpoints.

FIG. 8 is a flowchart of an exemplary process for establishing a GRE Heartbeat session between endpoints. At Step 400, a GRE tunnel initiator sends a tunnel endpoint a setup message with a GRE Heartbeat Capability Attribute set to one. This indicates to the tunnel endpoint that the tunnel initiator wants to use GRE Heartbeats. Then, at Step 402, the GRE tunnel endpoint sends the GRE tunnel initiator a setup message with a GRE Heartbeat Capability Attribute set to one, which also indicates that the tunnel endpoint will use GRE Heartbeats. As the GRE tunnel initiator requested to use GRE Heartbeats and in turn received an indication from the tunnel endpoint to also use GRE Heartbeats, the GRE tunnel initiator and the tunnel endpoint then use GRE Heartbeats, as shown at Step 404.

As part of establishing the GRE session, the endpoint can negotiate a unique identifier for the GRE Heartbeat session between the two endpoints. Each endpoint can serve as an endpoint for more than one GRE tunnel, and more than one GRE tunnel may exist between the two endpoints. Thus, the unique identifier can avoid confusion between GRE Heartbeat sessions corresponding to different GRE tunnels. The identifier can be carried in the Sequence Number Field 322 of GRE Heartbeat packets sent between the endpoints.

The GRE Heartbeat session between the tunnel initiator and the tunnel endpoint is typically unidirectional. Thus, the tunnel endpoint would provide status information to the tunnel initiator, but the tunnel initiator would not in turn provide status information to the tunnel endpoint. For a unidirectional GRE tunnel, data packets would flow from the initiating endpoint to the receiving endpoint, but not from the receiving endpoint to the initiating endpoint. A unidirectional GRE Heartbeat session would allow the initiating endpoint to monitor the status of the receiving endpoint, and thus the recipient of all the data packets sent through the GRE tunnel. The receiving endpoint would not need to monitor the status of the initiating endpoint, as it would not be sending data packets to the initiating endpoint.

In a bi-directional GRE tunnel each endpoint can send packet through the GRE tunnel to the other endpoint. Therefore, for the bi-directional tunnel it may be advantageous for each tunnel endpoint to receive status information about the other tunnel endpoint. For the bi-directional GRE tunnel, the endpoints could negotiate two different GRE Heartbeat sessions. For example, one GRE Heartbeat session could provide status information about the initiating endpoint to the receiving endpoint, and the other GRE Heartbeat session could provide status information about the receiving endpoint to the initiating endpoint. Each GRE Heartbeat session could use its own unique identifier.

Of course, a single GRE Heartbeat session could also be bi-directional. Thus, in a single GRE Heartbeat session the initiating endpoint could provide status information to the receiving endpoint, and the receiving endpoint could provide status information to the initiating endpoint. While the GRE Heartbeat session would use a single unique identifier for the session, different values in the Sequence Number Field 322 could differentiate the various requests and responses for status information between the endpoints. Of course, it is also possible to use the bi-directional GRE Heartbeat session between endpoints of a unidirectional GRE tunnel, and it is also possible to use more than one GRE Heartbeat session between endpoint of a unidirectional GRE tunnel.

Figure 9:
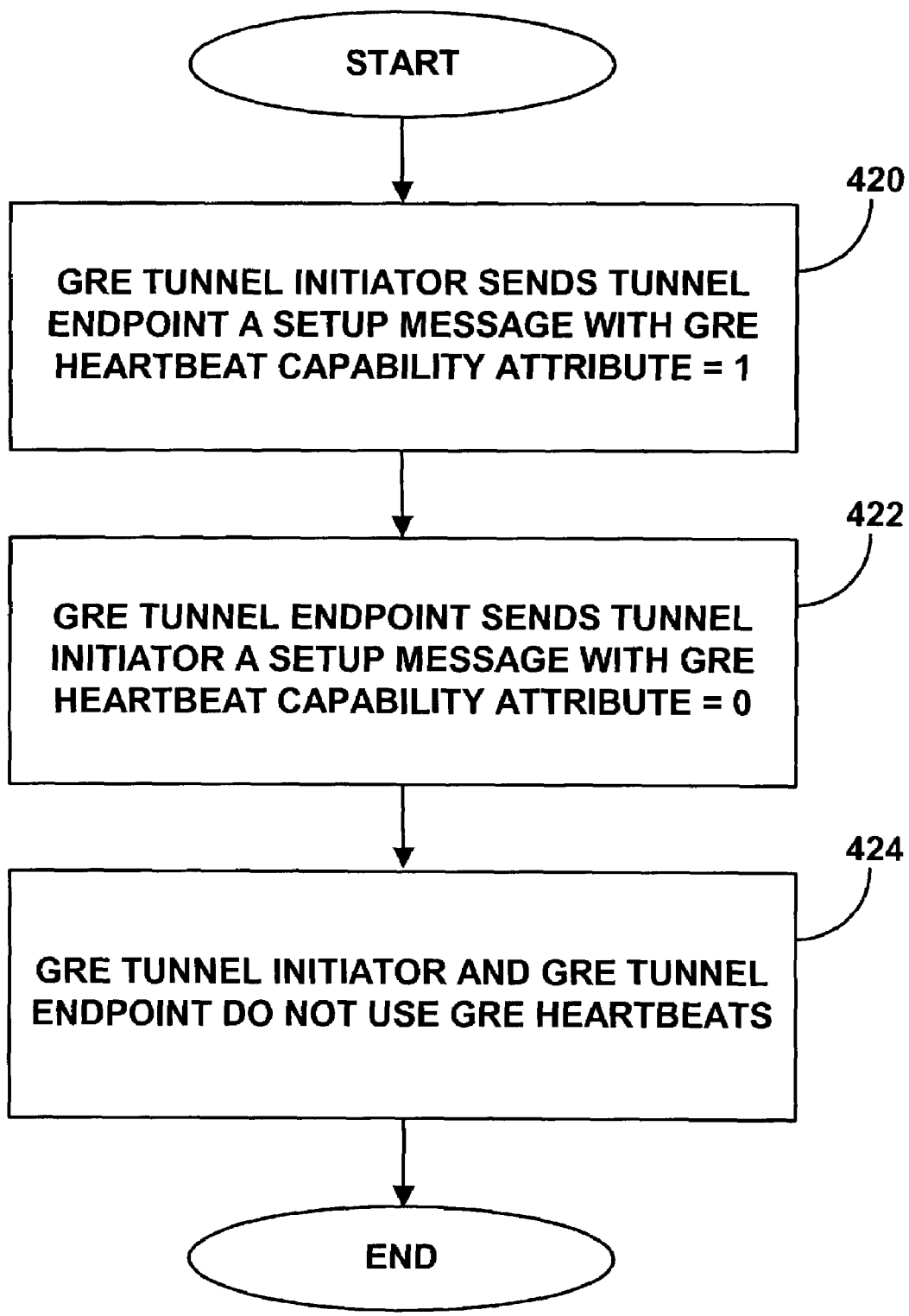
FIG. 9 is a flowchart of an exemplary process for attempting to establish a GRE Heartbeat session where a tunnel endpoint supports GRE Heartbeats but declines to use the GRE Heartbeats.

FIG. 9 is a flowchart of an exemplary process for attempting to establish a GRE Heartbeats session where an endpoint supports GRE Heartbeats but declines to use the GRE Heartbeats. At Step 420, a GRE tunnel initiator sends a tunnel endpoint a setup message with a GRE Heartbeat Capability Attribute set to one, thereby indicating to the tunnel endpoint to use GRE Heartbeats. Then, at Step 422, the GRE tunnel endpoint sends the GRE tunnel initiator a setup message with the GRE heartbeat indicator set to zero, thereby indicating not to use GRE Heartbeats. Although the endpoint could support GRE Heartbeats, it indicated to the tunnel initiator not to use the Heartbeats. Since the tunnel initiator received an indication from the tunnel endpoint not to use GRE Heartbeats, the GRE tunnel initiator and the GRE tunnel endpoint do not use GRE Heartbeats, as shown at Step 424.

Figure 10:
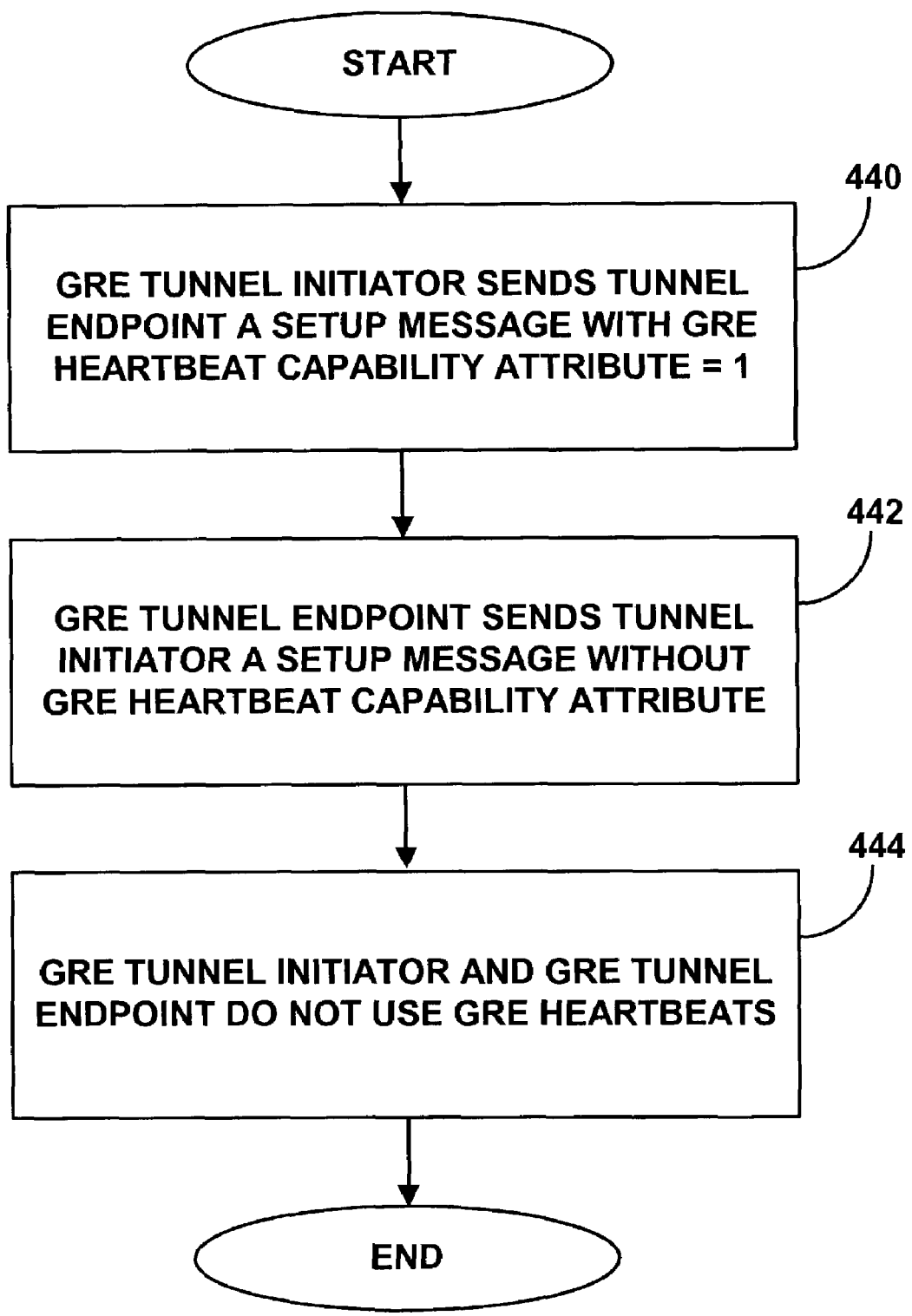
FIG. 10 is a flowchart of an exemplary process for attempting to establish a GRE Heartbeat session where a tunnel endpoint does not support GRE Heartbeats.

FIG. 10 is a flowchart of an exemplary process for attempting to establish a GRE Heartbeat session where an endpoint does not support GRE Heartbeats. At Step 440, a GRE tunnel initiator sends a tunnel endpoint a setup message with a GRE Heartbeat Capability Attribute set to one, thereby requesting that the endpoint use GRE Heartbeats. Then, at Step 442, the GRE tunnel endpoint sends the GRE tunnel initiator a setup message without a GRE Heartbeat capability attribute, thereby indicating to the tunnel initiator that the tunnel endpoint does not support GRE Heartbeats. Then, at Step 444, the GRE tunnel initiator and the tunnel endpoint do not use GRE Heartbeats.

Figure 11:
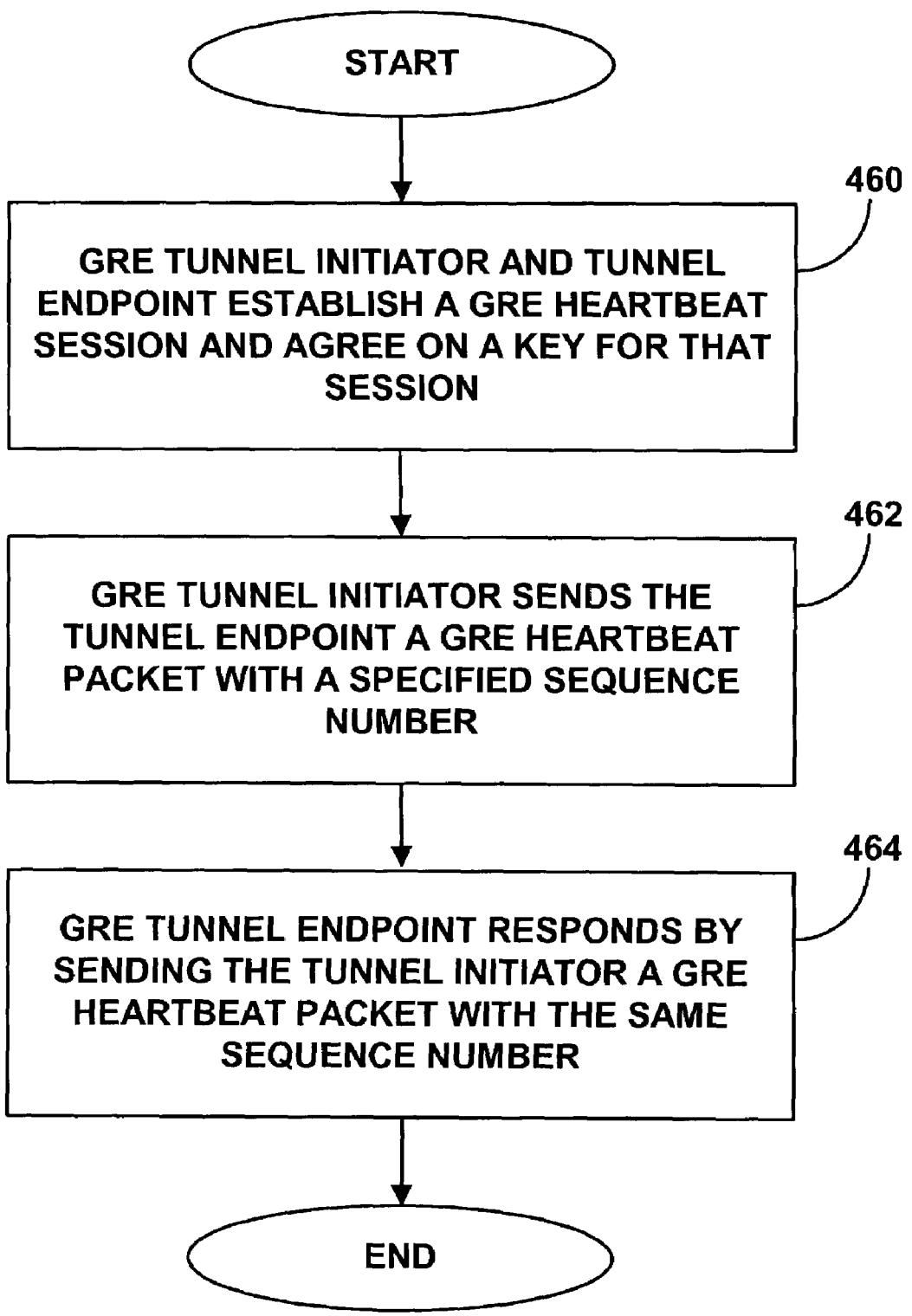
FIG. 11 is a flowchart of an exemplary process for a tunnel initiator and a tunnel endpoint exchanging GRE Heartbeats.

FIG. 11 is a flowchart of an exemplary process for a tunnel initiator and a tunnel endpoint exchanging GRE Heartbeats. At Step 460, the tunnel initiator and the tunnel endpoint establish a GRE Heartbeat session and agree on a key for that session, for example using the process described in FIG. 8. The key can uniquely identify the GRE Heartbeat session.

Then, at Step 462, the GRE tunnel initiator sends the tunnel endpoint a GRE Heartbeat packet with a specified sequence number. The sequence number can be carried in the Sequence Number Field 322 of the GRE Heartbeat packet. Additionally, the GRE Heartbeat packet identifies the particular GRE session, such as by including the key for that GRE session in the Key Field 320 of the GRE Heartbeat packet.

Then, at Step 464, the GRE tunnel endpoint responds by sending the tunnel initiator a GRE Heartbeat packet with the same sequence number in the Sequence Field 322. The GRE Heartbeat packet sent by the tunnel endpoint also identifies the particular GRE session using the session's key, which is included in the Key Field 320 of the GRE Heartbeat packet. By receiving the GRE Heartbeat packet sent by the tunnel initiator and returning its own GRE Heartbeat packet, the tunnel endpoint indicates to the tunnel initiator that it remains alive and reachable.

The tunnel indicator can periodically send GRE Heartbeat packets to the tunnel endpoint in order to check its liveness and reachability. The GRE Heartbeat packets can be sent at specified intervals, such as once a minute. Of course other time periods can also be used. Alternatively, the GRE Heartbeat packets can be sent at random times. The tunnel indicator can change the sequence number used in the GRE Heartbeat in order to accurately identify incoming GRE Heartbeat packets to a particular request for that message. For example, the tunnel initiator can increment the sequence number each time it sends the tunnel endpoint a new GRE Heartbeat packet. Using a unique identifier for each exchange of GRE Heartbeat packets allows the tunnel initiator to accurately identify an incoming GRE Heartbeat packet with a particular request for that packet, it allows the tunnel initiator to determine how long it took the tunnel endpoint to response by sending the GRE Heartbeat packet, and it allows the tunnel initiator to determine how many requests for GRE Heartbeat packets are outstanding.

Figure 12:
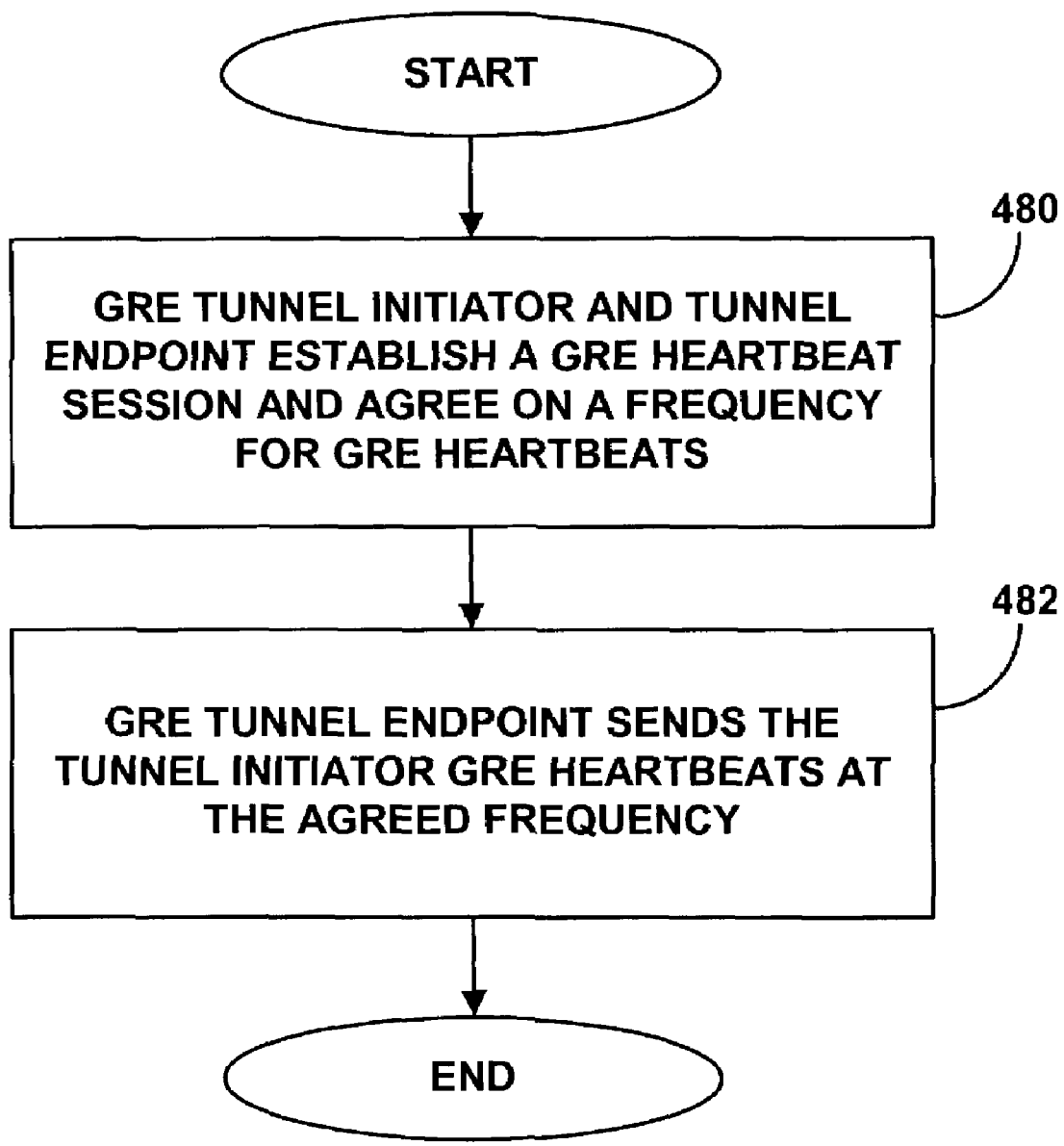
FIG. 12 is a flowchart of an alternate process for a tunnel initiator and a tunnel endpoint exchanging GRE Heartbeats.

FIG. 12 is a flowchart of an alternate process for a tunnel initiator and a tunnel endpoint exchanging GRE Heartbeats. At Step 480, the GRE tunnel initiator and the tunnel endpoint establish a GRE Heartbeat session, for example using the process described in FIG. 8, and agree on a frequency for GRE Heartbeats. The frequency can correspond to time intervals at which the endpoint will send the tunnel initiator GRE Heartbeat packets. For example, the GRE tunnel initiator and the tunnel endpoint can agree that the tunnel endpoint will send the tunnel initiator GRE Heartbeat packets once a minute. Of course, other time periods can also be used.

Then, at Step 482, the GRE tunnel endpoint sends the tunnel initiator GRE Heartbeats at the agreed frequency. The GRE Heartbeat packets sent from the tunnel endpoint to the tunnel initiator can be sent without first receiving a GRE Heartbeat packets from the tunnel initiator. By identifying the frequency for sending GRE Heartbeat packets, the GRE tunnel initiator can expect to receive the GRE Heartbeat packets from the tunnel endpoint at the specified frequency. If the tunnel initiator stops receiving the GRE Heartbeat packets, then the tunnel initiator can determine that the tunnel endpoint is unreachable. The tunnel endpoint can, for example, set the sequence number carried in the Sequence Number Field 322 to an initial value. As the tunnel endpoint sends GRE Heartbeat packets, it can increment the sequence number. This can allow the tunnel initiator to identify an order in which the GRE Heartbeat packets are sent.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for conveying status information between endpoints of a tunnel, the method comprising:
    establishing a tunnel between a first endpoint and a second endpoint, wherein the first and second endpoints are connected to a packet data network, and wherein the tunnel uses a tunneling protocol to send packets between the first and second endpoints via the tunnel;
    determining a frequency at which the second endpoint will send status messages to the first endpoint; and
    sending status messages from the second endpoint to the first endpoint at the frequency via the tunnel, wherein the status messages are sent using the tunneling protocol.

2. A computer readable medium having stored therein instructions for causing a central processing unit to execute the method of claim 1.

3. The method of claim 1, further comprising:
    receiving from the first endpoint a request to send the status messages to the first endpoint, wherein the request is sent via the tunnel using the tunneling protocol.

4. The method of claim 1, wherein establishing the tunnel between the first endpoint and the second endpoint comprises:
    determining that the second endpoint is capable of receiving the request and responsively sending the status messages.

5. The method of claim 1, wherein the tunneling protocol is GRE.

6. The method of claim 1, wherein the tunnel protocol is GRE, wherein the status messages use a GRE header, and wherein a field in the GRE header can be used to differentiate the status messages from GRE data packets.

7. The method of claim 1, wherein the first endpoint is a home agent in a Mobile IP session, wherein the second endpoint is a foreign agent in the Mobile IP session, and wherein the tunnel uses GRE to implement IP-in-IP tunneling.

8. The method of claim 1, wherein the first endpoint is a first firewall in a VPN, wherein the second endpoint is a second firewall in a VPN, and wherein the tunnel uses PPTP to implement PPP-over-IP tunneling.

9. The method of claim 1, wherein the first endpoint is a computing device in a VPN, wherein the second endpoint is a firewall in a VPN, and wherein the tunnel uses PPTP to implement PPP-over-IP tunneling.

10. A method for providing status information for endpoints of a GRE tunnel, the method comprising:
    establishing a GRE tunneling session between a first endpoint of a GRE tunnel and a second endpoint of the GRE tunnel;
    establishing a GRE Heartbeat session between the first endpoint arid the second endpoint, wherein the first and second endpoint uniquely identify the GRE Heartbeat session using a heartbeat session identifier;
    receiving a request from the first endpoint for a status message, wherein the request is sent from the first endpoint to the second endpoint through the GRE tunnel, wherein the request uses a GRE header, and wherein the request identifies the GRE Heartbeat session using the heartbeat session identifier; and
    responsively sending the status message to the first endpoint via the GRE tunnel, wherein the status message uses a GRE header, and wherein the status message identifies the GRE Heartbeat session using the heartbeat session identifier.

11. A computer readable medium having stared therein instructions for causing a central processing unit to execute the method of claim 10.

12. The method of claim 10, wherein the GRE header for the status message includes a key field, and wherein the key field carries the heartbeat session identifier.

13. The method of claim 10, wherein the request is uniquely identified using a sequence number, wherein the GRE header for the status message includes a sequence number field, and wherein the sequence number field carries the sequence number.

14. The method of claim 10, wherein the first endpoint is a home agent in a Mobile IP session, wherein the second endpoint is a foreign agent in the Mobile IP session, and wherein the tunnel uses GRE to implement IP-in-IP tunneling.

15. The method of claim 10, wherein the first endpoint is a first firewall in a VPN, wherein the second endpoint is a second firewall in a VPN and wherein the tunnel uses PPTP to implement PPP-over-IP tunneling.

16. The method of claim 10, wherein the first endpoint is a computing device in a VPN, wherein the second endpoint is a firewall in a VPN, and wherein The tunnel uses PPTP to implement PPP-over-IP tunneling.

17. A method for providing status information to an initiating tunnel endpoint of a GRE tunnel, the method comprising:
    receiving a GRE packet from the initiating tunnel endpoint via the GRE tunnel;
    checking an indicator bit in the GRE packet to determine that the packet is a status request from the initiating endpoint, wherein the indicator bit differentiates the status request sent via tile GRE tunnel from GRE data packets sent via The GRE tunnel; and
    responsively sending the tunnel initiator a status packet via the GRE tunnel, wherein the status packet also includes an indicator bit to differentiate the status packet sent via the GRE tunnel from GRE data packets sent via the GRE tunnel.

18. A computer readable medium having stored therein instructions for causing a central processing unit to execute the method of claim 17.

19. A method for requesting status information from an endpoint in a GRE tunnel, the method comprising:
   establishing a GRE Heartbeat session with the endpoint, wherein the GRE Heartbeat session is uniquely identified using a heartbeat session key;
   sending a first request for a first status packet to the endpoint via the GRE tunnel, wherein the first request includes the heartbeat session key, and wherein the first request includes a first identifier that corresponds to the first request; and
   receiving the first status packet from the endpoint via the GRE tunnel, wherein the first status packet includes the heartbeat session key, and wherein the first status packet includes the first identifier.

20. A computer readable medium having stored therein instructions for causing a central processing unit to execute the method of claim 19.

21. The method of claim 19, further comprising:
   sending a second request for a second status packet to the endpoint via the GRE tunnel, wherein the second request includes the heartbeat session key, wherein the second request includes a second identifier that corresponds to the second request, and wherein the second identifier is different from the first identifier; and
   receiving the second status packet from the endpoint via the GRE tunnel, wherein the second status packet includes the heartbeat session key, and wherein the second status packet includes the second identifier.

22. The method of claim 19, wherein the request includes an indicator bit to differentiate the request from GRE data packets, and wherein the status packet includes an indicator bit to differentiate the status packet from GRE data packets.

23. A memory for storing GRE heartbeat packets for a GRE heartbeat session between endpoints of a GRE tunnel, the memory comprising:
   a data structure stored in the memory, the data structure comprising:
      an indicator bit, wherein the indicator bit differentiates GRE heartbeat packets from GRE data packets;
      a key field, wherein the key field can store a unique indicator for the GRE heartbeat session; and
      a sequence number field, wherein the sequence number field can store a unique identifier corresponding to a GRE heartbeat packet from a tunnel initiator and a responsive GRE heartbeat packet from the endpoint.

* * * * *